United States Patent [19]

Strobl

[11] Patent Number: 5,196,750

[45] Date of Patent: Mar. 23, 1993

[54] ELECTRIC MOTORS WITH ELECTROMAGNETIC INTERFERENCE REDUCTION

[75] Inventor: Georg Strobl, Repulse Bay Garden, Hong Kong

[73] Assignee: Johnson Electric S.A., Switzerland

[21] Appl. No.: 766,114

[22] Filed: Sep. 27, 1991

[30] Foreign Application Priority Data

Sep. 28, 1990 [GB] United Kingdom ............... 9021108

[51] Int. Cl.⁵ ........................................... H02K 13/00
[52] U.S. Cl. ..................................... 310/239; 310/242
[58] Field of Search ............... 310/239, 242, 248, 249, 310/40 MM, 152

[56] References Cited

U.S. PATENT DOCUMENTS

| | | | |
|---|---|---|---|
| 4,157,483 | 6/1979 | Frimley | 310/242 |
| 4,728,835 | 3/1988 | Baines | 310/71 |
| 4,746,829 | 5/1988 | Strobl | 310/239 |
| 4,801,833 | 1/1989 | Dye | 310/239 |

Primary Examiner—Steven L. Stephan
Assistant Examiner—Matthew Nguyen
Attorney, Agent, or Firm—Ostrolenk, Faber, Gerb & Soffen

[57] ABSTRACT

A brush holder 14 has mounted therein a suppression circuit consisting of chokes H1 and H2, and capacitors C1, C2 and C3. Brush mounting plates 19 are integrally formed with slotted wings 19C for receiving and gripping the wire ends of the chokes and supply terminals 18 have slotted wings 18C for likewise receiving and gripping respective wire connections. The plates 19 and terminals 18 have integrally formed end portions which are soldered or otherwise electrically connected to a circuit board 24 on which the capacitors are mounted. The brush holder 14 is a single plastics molding having compartments, shaped and formed for receiving and holding the various components, as shown in FIG. 3.

9 Claims, 4 Drawing Sheets

ELECTRIC MOTORS WITH ELECTROMAGNETIC INTERFERENCE REDUCTION

BACKGROUND OF THE INVENTION

The in relates to electric motors.

The invention relates more particularly to small permanent magnet direct current motors. Such motor often require, especially where used in automotive applications, electromagnetic interference suppression to prevent problems with radio receiver receptions and more importantly interference with the satisfactory operation of control integrated circuits concerned with the safe running of the vehicle. Often there are statutory regulations applicable to all equipment used in automotive and other environments to reduce electromagnetic interference or noise and which must be met by any motors used in appropriate applications governed by such regulations.

Suppression circuits are therefore provided to meet the regulations and are used together with the motor as part of the supply or control circuits of the motor. The suppression circuits normally include a number of different discrete electrical components which must be electrically connected together in a manner in which the electrical connections between the components themselves are not prone to become a source of noise. Also the electrical connections must preferably be reliably reproducible during mass-production assembly and yet as cheap as possible.

BRIEF DESCRIPTION OF THE INVENTION

According to the invention there is provided a brush holder for a permanent magnet direct current motor for supporting discrete electric circuit components, some of which are mounted on a printed circuit board, forming a suppression circuit for the motor, power input terminals and brush leaves, including electrically conductive brush leaf mounting plates integrally formed with wire receiving and gripping slots to mechanically and electrically connect wires of the electrical components to the mounting plates and with end portions which electrically connect to the printed circuit board.

The power terminals may be integrally formed with wire receiving and gripping slots to mechanically and electrically connect wires of the components to the power terminals and with end portions which electrically connect to the printed circuit board.

The slots are preferably formed such that insulation is removed from each of the wires when the wire is forced into the slot, to form a clean metal connection between the wires and the mounting plate and/or power terminal as the case may be.

A lateral extension may be connected to one of the mounting plates arranged in use to contact and ground a casing of the motor.

The brush leaves may be rivotted to the mounting plates.

The brush holder is preferably formed of a single plastics moulding including inner compartments shaped and formed for receiving and holding respective of the discrete electrical components, the circuit board, the mounting plates and the power terminals.

BRIEF DESCRIPTION OF THE DRAWINGS

An embodiment of the invention will be further described by way of example with reference to the accompanying drawings, in which.

DETAILED DESCRIPTION OF THE PREFERRED EMBODIMENT

Figure 1:
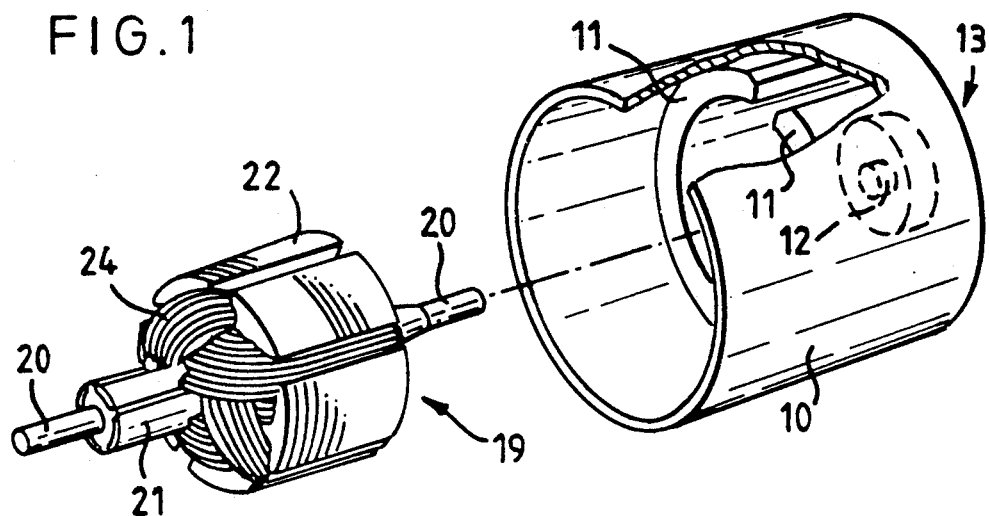
FIG. 1 is an exploded perspective view of part of a fractional horsepower permanent magnet direct current motor embodying the invention without showing an end cap.

Referring to the drawings in FIGS. 1 to 4, the fractional horsepower permanent magnet direct current motor has a housing comprising a deep drawn can-like steel casing 10 carrying permanent magnets 11, and a bearing 12 in an end wall 13. The casing 10 is closed by a plasticbrush holder 14 and a steel end cap which carries a bearing (not shown), two brushleaves 16 each carrying a respective brush 17 and two terminals 18. Brush leaf mounting plates 19 are supported in the brush holder 14 as is a printed circuit board 24. A rotor 19 of the motor comprises a shaft 20, a commutator 21 and wound armature 22 mounted on the shaft 20. The armature 22 comprises a stack of steel laminations which are tightly fit on the shaft 20 and a wire winding 24 wound about the arms of the armature and connected to the commutator 21.

In the assembled motor the shaft 20 runs in both the bearing 12 and a bearing (not shown) supported in the steel end cap (not shown), the end cap closing the casing 10 and the brushes 17 bearing on the commutator 21.

Figure 2:
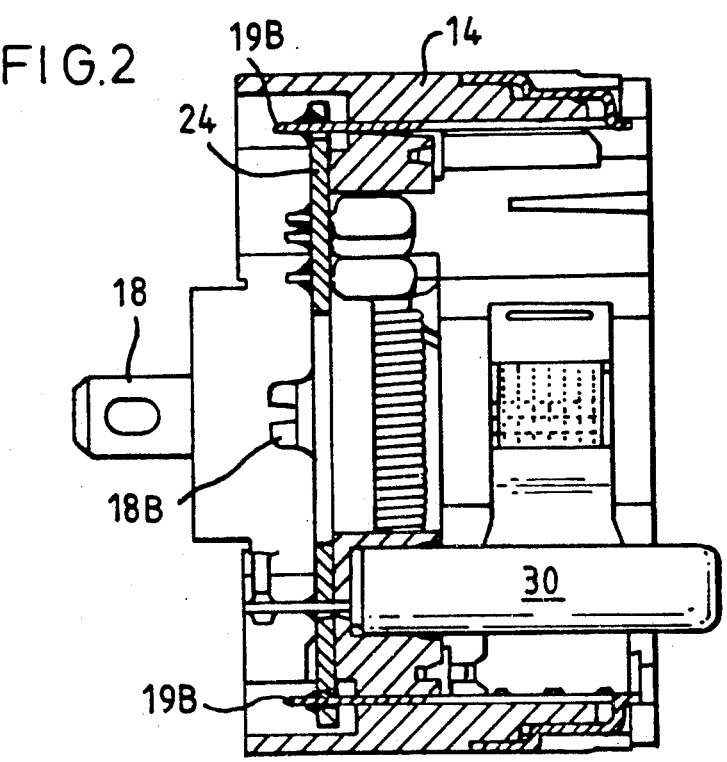
FIG. 2 is a sectional side view of a brush holder for the motor of FIG. 1, in which is mounted a brush assembly, terminals for receiving electrical power from an external source and discrete electrical components forming a suppression circuit.
Figure 3:
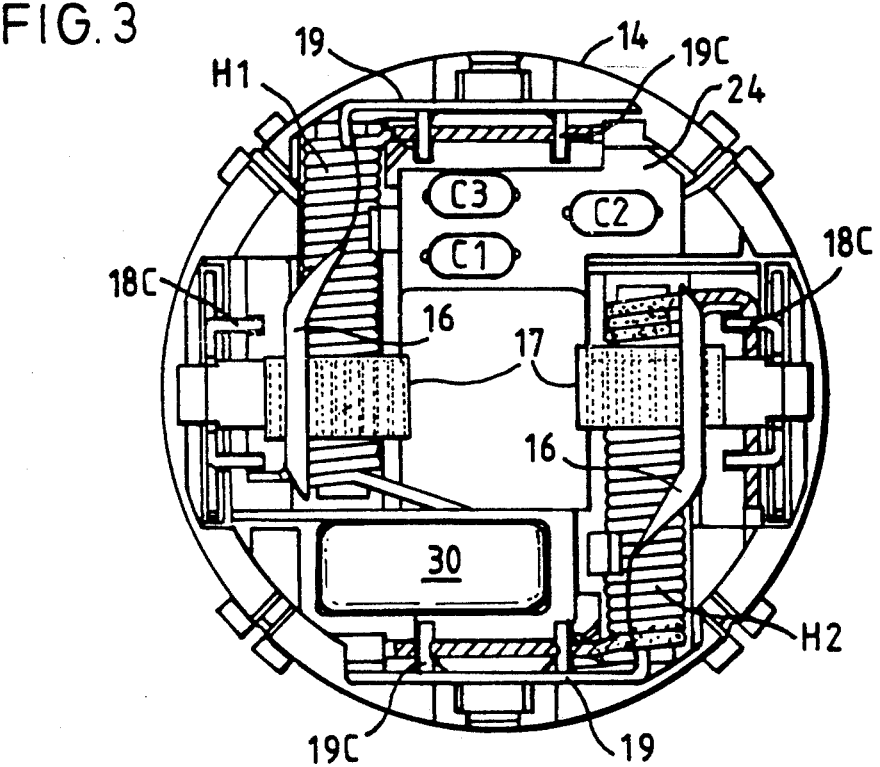
FIG. 3 shows an end inside view of the brush holder of FIG. 1.
Figure 4:
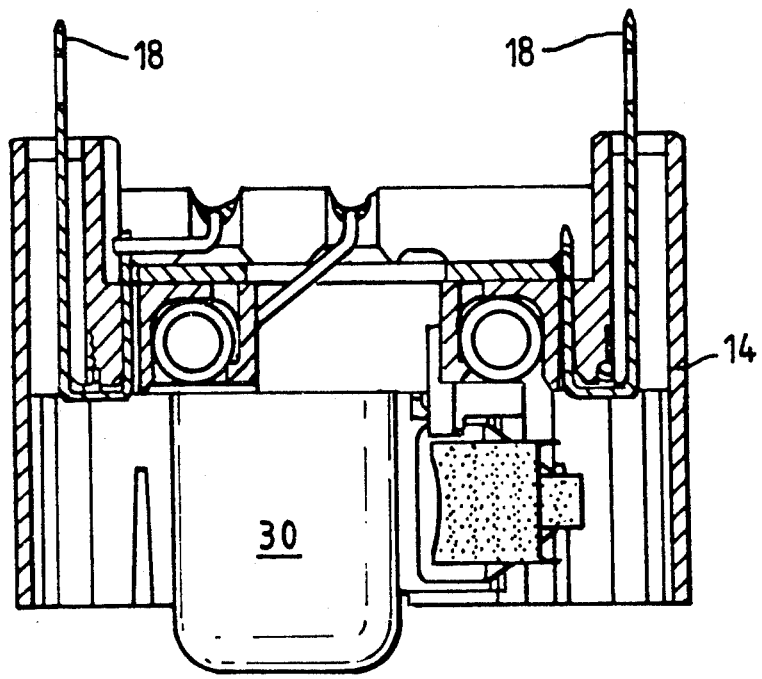
FIG. 4 shows another sectional side view of the brush holder of FIG. 1.
Figure 5:
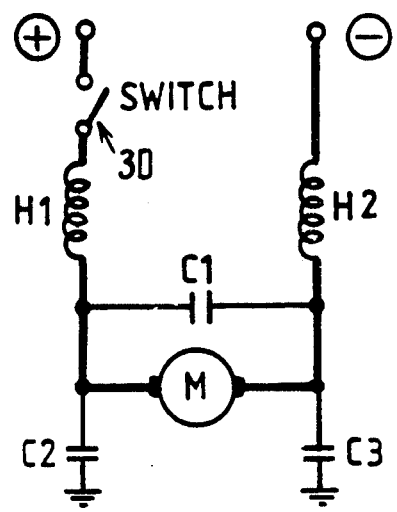
FIG. 5 shows a circuit diagram for the motor.

The suppression circuit shown in FIG. 5 comprises a number of discrete electrical components consisting of two chokes H1 and H2 and three capacitors C1, C2 and C3 mounted on the circuit board 24. A thermal cut-out switch 30 is also provided. In FIGS. 2 to 4, these components are clearly shown mounted and held in the brush holder 14.

Figure 6:
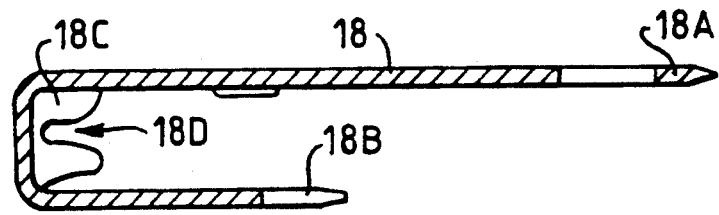
FIG. 6 shows a sectional view of a power terminal for the motor.

The terminals 18, see especially FIG. 6, each comprise an external connecting part 18A and an end portion 18B. Integrally formed bend-over opposing wings 18C are each formed with a receiving and gripping slot 18D for connection to one wire connection of the switch 30 (or via a link to the printed circuit board) or one wire end of the choke H2, respectively. The slot 18D is arranged to remove any insulation from the wires when (during assembly) they are forced into the slot to form a clean metal connection between the respective wires and terminals 18.

Figure 7:
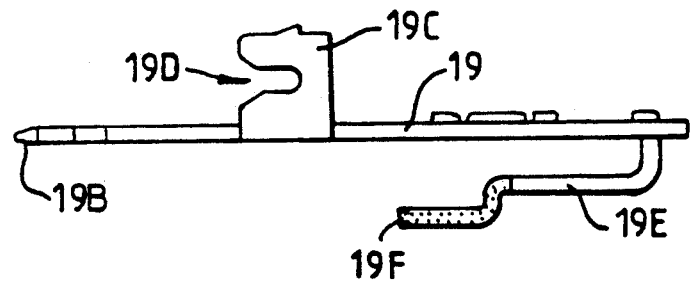
FIG. 7 shows a side view of a brush leaf mounting plate.
Figure 8:
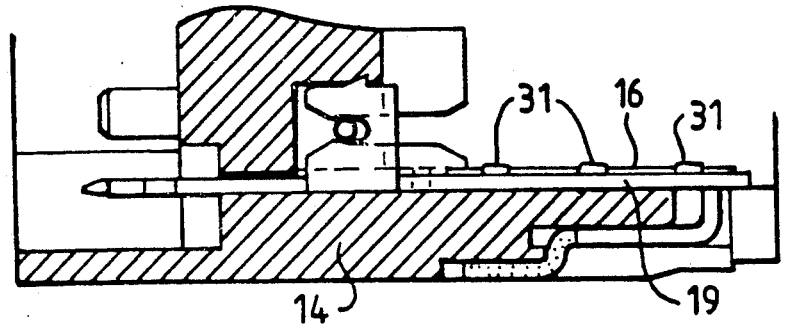
FIG. 8 shows the mounting plate and sectional view of part of the brush holder.

Similarly, the brush leaf mounting plates 19, see especially FIGS. 7 and 8, are integrally formed with bent-over opposing wings 19C, each formed with a slot 19D for electrically and mechanically connecting to respective wire ends of the chokes H1 and H2. FIG. 8 shows how the plates 19 fit into and are held in the brush holder 14 and are connected by rivots 31 to the brush leaves 16. End portions 19B formed integrally with the remainder of the plates 19, are connected in use to components on the circuit board 24 either by connecting into plated holes in the circuit board 24 and/or by soldering. An anchor extension 19E is provided for the plate 19 to help anchor the plate in the end cap 14 which for the negative (or grounded) supply side may have an added lateral extension 19F which in use grounds the casing 10 by contacting the casing 10 when the motor is fully assembled.

Figure 9:
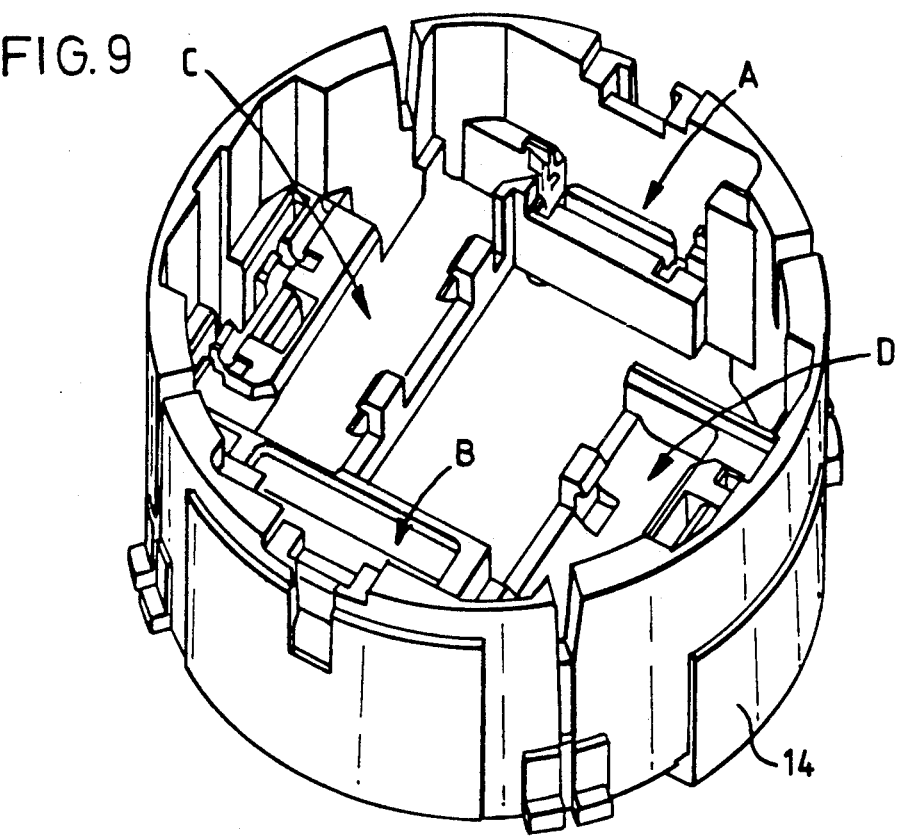
FIG. 9 shows an isometric views of the brush holder.
Figure 10:
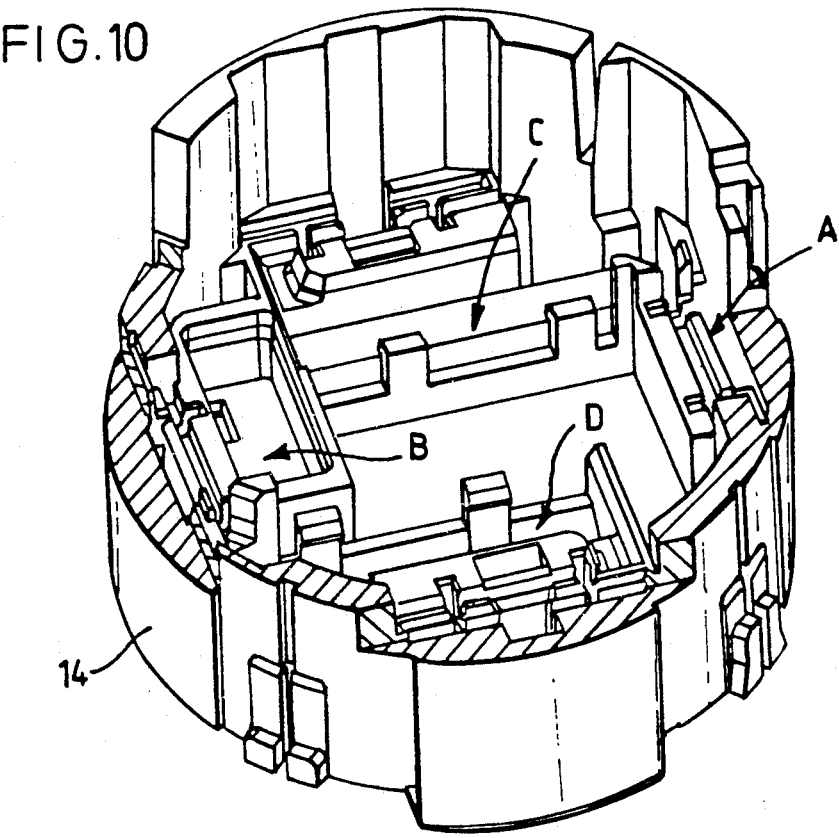
FIG. 10 is another partially cut-away isometric view of the brush holder.

The brush holder 14, see FIGS. 9 and 10, consists of a single plastic moulding formed with compartments shaped and formed for receiving the various components. To assembly the parts in the brush holder 14, the printed circuit board 24 is placed in the brush holder at A and brush leaf mounting plates 19 electrically connected to the board 24 by insertion of the end portions 19B through plated holes in the board and/or by soldering. The terminals 18 are also connected to the printed circuit board or to one wire of the switch 30, respectively, by their ends 18B. The switch 30 protects the motor from any or all of overheating over loading or stalling as required. The switch 30 which fits into the compartment B has one of its terminals soldered to the circuit board to fix it in position. Its other terminal is then soldered to one wire end of the choke H1. The other wire end of the choke H1 and opposite wire ends of the choke H2 are forced into respective of the slots 18D, and 19D, and 18D as will be clear from the arrangement shown in FIG. 3. The chokes H1 and H2 are clipped into compartments C and D, see FIGS. 9 and 10, respectively. The brush leaves 16 are then rivotted to the plates 19.

The described arrangement enables a quick easy and cheap assembly procedure to be carried out in mass production. The suppression circuit is conveniently and easily fitted in the brush holder 14 and a motor ground readily provided through the lateral extension 19F on one of the mounting plates 19. The solder connections where required are carried out on the same or nearly the same exposed plane in the end cap 14 and so can be carried out by using a single automatic soldering machine. This avoids manual soldering which is not only time consuming and labour intensive but leads invariably to some 'dry' joints being formed. By using slots 18D and 19D to make connections to the wire ends of the chokes, and preferably using "insulation displacement insertion" as mentioned, good clean electrical connections are ensured; crimping connections are therefore avoided. One end of the switch 30 may also be connected using an appropriate one of the slots 18D.

The suppression components themselves are chosen to meet different motor performance requirements and levels of suppression as required.

I claim:

1. In an electric motor, the combination comprising:
   (a) a plastic brush holder having a compartment and a plurality of openings formed therein;
   (b) a circuit board mounted in said compartment;
   (c) a suppression circuit mounted on said circuit board and including discrete electrical components, at least some of which have respective wire ends;
   (d) first and second power input terminals extending through respective ones of said openings, each of said power input terminals having a wire receiving and gripping slot which automatically receives and grips a respective said wire end when said first and second power terminals are inserted through their respective openings; and
   (e) first and second brush mounting plates extending through respective openings formed in said brush holder, each of said brush mounting plates having a wire receiving and gripping slot which automatically receives and grips a respective said wire end when said first and second brush mounting plates are inserted through their respective openings.

2. The combination according to claim 1, wherein said plastic brush holder is a generally hollow, unitary plastic member.

3. The combination according to claim 1, in which said printed circuit board is mounted with its major plane at right angles to a central longitudinal axis of said plastic brush holder and has apertures formed therein, said first terminal and said first mounting plate extending through respective ones of said apertures.

4. The combination according to claim 3, in which said apertures are plated through holes so as to electrically directly connect an end of said terminal and an end of said mounting plate to said circuit board.

5. The combination according to claim 1, wherein said wire ends are coated with an insulative coating and wherein said receiving and gripping slots strip said insulative coating and come into electrical contact with the wire in said wire ends when said wire ends are received and gripped by said receiving and gripping slot.

6. In an electric motor, the combination comprising:
   (a) a metal casing;
   (b) a plastic brush holder having a compartment and a plurality of openings formed therein, said plastic brush holder being housed in said casing;
   (c) a circuit board mounted in said compartment, said circuit board being mounted with its major plane at right angles to a central longitudinal axis of said metal casing, said circuit board having first and second apertures formed therein, said apertures being plated through holes;
   (d) a suppression circuit mounted on said circuit board and including discrete electrical components, at least some of which have respective wire ends;
   (e) first and second power input terminals extending through respective ones o said openings, each of said power input terminals having a wire receiving and gripping slot which automatically receives and grips a respective said wire end when said first and second power terminals are inserted through their respective openings, said first power input terminal also extending through said plated through hole in said circuit board so as to electrically directly connect said first power terminal to said circuit board;
   (f) first and second brush mounting plates extending through respective openings in said brush holder, each of said brush mounting plates having a wire receiving and gripping slot which automatically receives an grips a respective said wire end when said first and second brush mounting plates are inserted through their respective openings, said first brush mounting plate also extending through a respective said plated through hole in said circuit board so as to electrically directly connect said first brush mounting plate to said circuit board; and (g) at least one of said first and second power terminals having a lateral extension which contacts against said metal casing to ground said casing of said motor in use.

7. The combination according to claim 6, wherein said wire ends are coated with an insulative coating and wherein said receiving and gripping slots strip said insulative coating and come into electrical contact with the wire in said wire ends when said wire ends are received and gripped by said receiving and gripping slot.

8. In an electric motor, the combination comprising:

(a) a plastic brush holder having first and second compartments and a plurality of openings formed therein;

(b) a circuit board mounted in said first compartment;

(c) a thermal cutout switch mounted in said second compartment, said thermal cutout switch having a wire end;

(d) a suppression circuit mounted on said circuit board and including discrete electrical components, at least some of which have respective wire ends;

(e) first and second power input terminals extending through respective ones of said openings, each of said power input terminals having a wire receiving and gripping slot which automatically receives and grips a respective said wire end when said first and second power terminals are inserted through their respective opening; and (f) first and second brush mounting plates extending through respective openings formed in said brush holder, each of said brush mounting plates having a wire receiving and gripping slot which automatically receives and grips a respective said wire end when said first and second brush mounting plates are inserted through their respective openings.

9. The combination according to claim 8, wherein said wire ends are coated with an insulative coating and wherein said receiving and gripping slots strip said insulative coating and come into electrical contact with the wire in said wire ends when said wire ends are received and gripped by said receiving and gripping slot.

* * * * *